April 16, 1946.    G. C. STITH    2,398,474
WEEDER
Filed Dec. 10, 1943    2 Sheets-Sheet 1

Inventor
George C. Stith,
By McMorrow and Berman
Attorneys

April 16, 1946.　　　G. C. STITH　　　2,398,474
WEEDER
Filed Dec. 10, 1943　　　2 Sheets-Sheet 2

Inventor
George C. Stith,
By McMorrow and Berman
Attorneys

Patented Apr. 16, 1946

2,398,474

UNITED STATES PATENT OFFICE 2,398,474

WEEDER

George C. Stith, Cheriton, Va.

Application December 10, 1943, Serial No. 513,766

1 Claim. (Cl. 55—47)

This invention relates to an agricultural device especially adapted for destroying weeds and other undesirable growth, and has for the primary object the provision of a device of this character which is constructed to bend over and crush undesirable growth and remove the latter from the soil along with its roots and tear said growth to destroy its life.

Another object of this invention is the provision of a device of the above stated character which may be employed as a weeder of soil between rows of growing vegetation without disturbing the vegetation and its roots.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a top plan view, partly in section, illustrating a weeder constructed in accordance with my invention.

Figure 1:
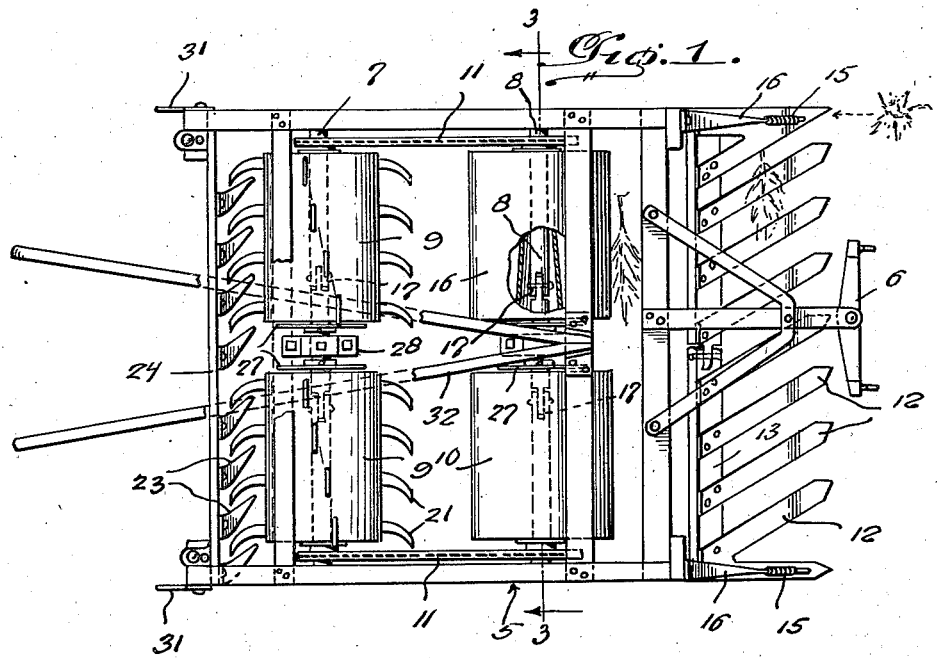
Figure 2:
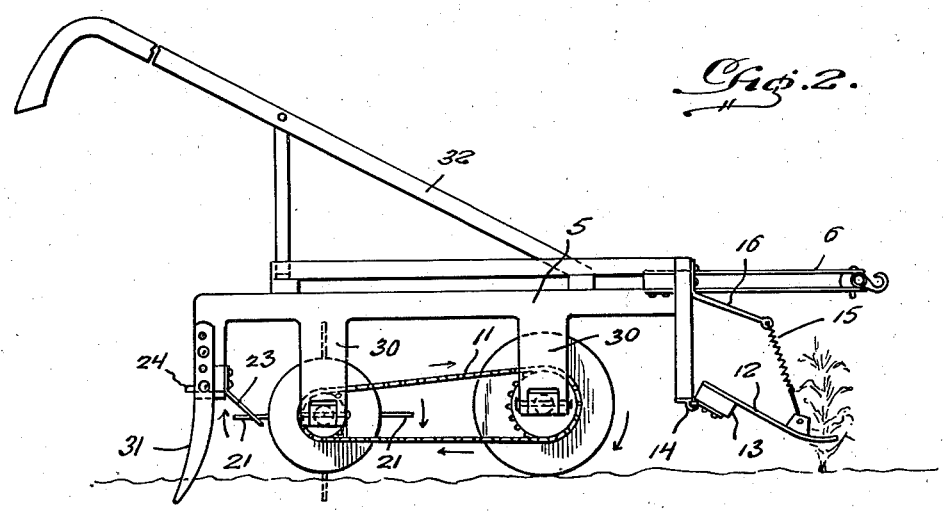
Figure 2 is a side elevation illustrating the device.
Figure 3:
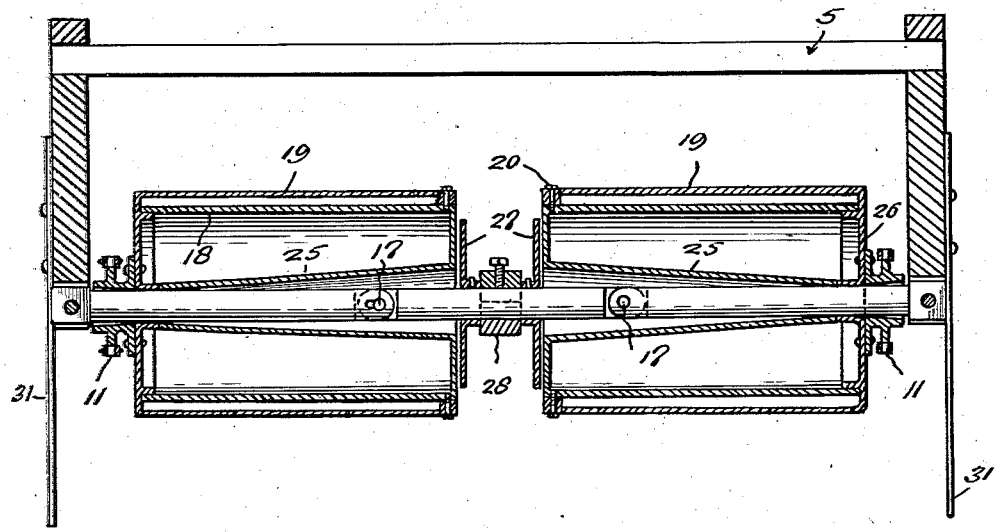
Figure 3 is a transverse sectional view taken on the line 3—3 of Figure 1.

Referring in detail to the drawings, the numeral 5 indicates a frame of substantially rectangular shape and having secured to its forward transverse member a draft hitch 6 to which a draft animal may be hitched to the frame for drawing the same forwardly.

Spaced axles 7 and 8 are journaled on the side members of the frame to support transversely of said frame digging devices 9 and crushing rollers 10 located forwardly of said digging devices. The diameter of the crushing rollers is greater than the diameter of the drum portions of the digging devices so that the device in entirety will be supported on the ground by the crushing rollers. The axles are connected together by sprocket chains and gears, indicated by the character 11, so that the crushing rollers traveling over the ground will bring about rotation of the digging devices 9 and preferably rotate the digging devices faster than the rotation of the rollers.

A group of elongated teeth 12 are arranged forwardly of the front of the frame and under the draft hitch 6 and are so arranged that the growth passing between the teeth is bent over toward the ground during the forward movement of the device so that the bent over growth can be engaged by the rollers and crushed against the ground. The teeth 12 are mounted on a bar 13 mounted on the frame for hinging movement, as shown at 14. The teeth are supported at a selected distance from the ground by yieldable supporting elements 15 connected to certain of the teeth and to brackets 16 secured on the frame. This construction will permit the teeth to move downwardly in the direction of the ground if excessive pressure is brought upon the teeth from any cause, such as engaging with a large amount of weeds, to assure that the weeds be bent over toward the ground by bringing the contact of the teeth with the weeds closer to the ground.

The digging devices 9 include drums constructed similarly to the rollers 10, that is, the mounting of the drums on their axle with respect to the mounting of the rollers on their axle. The axles are of sectional formation and pivotally and slidably connected together, as shown at 17. The pivotal connections permit the intermediate sections of the axles to have a limited endwise movement with respect to the other sections of the axles. The sectional axles will, to some extent, permit the rollers and digging devices to follow the uneven surface of the ground.

The rollers and digging devices are arranged in pairs and their mounting on the axles is such that they may move upwardly and downwardly or have a rocking motion on the axles to follow the unevenness of the ground.

Each digging device and each roller consists of inner and outer shells 18 and 19 detachably connected with each other, as shown at 20, whereby said shells may be separated from each other. The teeth of each row are preferably staggered, as shown in Figure 1, that is transversely of the device.

The teeth 21 of the digging devices are arcuately curved and act in the soil to tear the roots of the growth from the soil which growth has been mashed against the surface of the ground by the rollers 10. The teeth lift the roots from the soil and pass between teeth 23 oppositely curved and mounted on the rear member 24 of the frame, subjecting the weeds to a tearing action to assist in destroying the life of the weeds. The member 24 is adjustably mounted so that the teeth 23 may be moved toward and from the digging devices 9.

Each inner shell has a conical shaped portion 25 connected therewith and which surrounds the axle and has a bearing contact therewith at one end. Said end of the conical shaped portion is integral with an end wall 26 formed integrally with the outer shell. This construction permits unified movement of the inner and outer shells on the axle to follow the unevenness of the ground and still permit said shells to rotate, the axle acting as a support therefor.

Guard plates 27 are arranged on the axles between the adjacent ends of the rollers and digging devices to prevent dirt and other foreign matter from entering the conical shaped portions 25 and still permit a limited movement of the shells with respect to the axles for the purpose of following the unevenness of the ground.

Spacing collars 28 are secured on the axles by set screws between the guard plates to prevent the rollers and digging devices from shifting on the axles toward each other.

The axles are mounted on depending portions 30 on the frame for locating the frame in a plane above the rollers and digging devices.

Knife blades 31 may be secured to the rear corners of the frame 5 to engage in the soil and assisting in causing the device to travel in a selected or guided course. Handles 32 are secured to the frame to permit the operator to guide the device while being pulled by a draft animal.

From the foregoing description taken in connection with the accompanying drawings, it will be seen that a very efficient agricultural implement has been provided whereby undesirable growth may be bent over against the soil and crushed and then dug from the soil with the roots thereof and subjected to a tearing operation to assure destruction of the life of the growth. Further, it will be noted that the means of crushing the growth after being bent over the soil acts as a support for the device in its movement over the soil as well as means of imparting rotation to the digging devices.

A device of the kind described is simple in construction and both the crushing arrangement and digging arrangement will readily follow the unevenness of the ground as the device is drawn forward by a draft animal. Further, the construction is such that the entire device may move between rows of vegetation for removing from the soil lying between the rows of vegetation undesirable growth without disturbing the vegetation or the roots thereof.

While I have shown and described the preferred embodiment of my invention, it will be understood that minor changes in construction, combination and arrangement of parts may be made without departing from the spirit and scope of the invention claimed.

Having thus described the invention, what I claim is:

In a weeder, a frame, an axle secured to said frame, rollers journaled on said axle including inner and outer shells with the inner shells provided with conical shaped portions engaging the axle to permit rocking motion thereon, and means for detachably connecting the inner and outer shells of the rollers.

GEORGE C. STITH.